United States Patent
Chanda et al.

(10) Patent No.: US 8,117,216 B1
(45) Date of Patent: Feb. 14, 2012

(54) AUTOMATED SELECTION OF ITEM CATEGORIES FOR PRESENTING ITEM RECOMMENDATIONS

(75) Inventors: Gaurav Chanda, Seattle, WA (US); Brent Smith, Redmond, CA (US)

(73) Assignee: Amazon Technologies, Inc., Reno, NV (US)

( * ) Notice: Subject to any disclaimer, the term of this patent is extended or adjusted under 35 U.S.C. 154(b) by 624 days.

(21) Appl. No.: 12/198,432

(22) Filed: Aug. 26, 2008

(51) Int. Cl.
 *G06F 7/00* (2006.01)
 *G06F 17/30* (2006.01)
(52) U.S. Cl. ........................................ 707/754; 707/737
(58) Field of Classification Search .................. None
 See application file for complete search history.

(56) References Cited

U.S. PATENT DOCUMENTS

| | | |
|---|---|---|
| 6,366,910 B1 | 4/2002 | Rajaraman et al. |
| 6,466,918 B1 | 10/2002 | Spiegel et al. |
| 6,912,505 B2 | 6/2005 | Linden et al. |
| 6,963,850 B1 | 11/2005 | Bezos et al. |
| 6,963,867 B2 | 11/2005 | Ford et al. |
| 7,542,951 B1 | 6/2009 | Chakrabarti et al. |
| 7,689,457 B2 | 3/2010 | Chan et al. |
| 7,836,051 B1 | 11/2010 | Mason |
| 7,966,225 B2 | 6/2011 | Chan et al. |
| 2002/0174119 A1 | 11/2002 | Kummamuru et al. |
| 2003/0110181 A1 | 6/2003 | Schuetze et al. |
| 2004/0181554 A1 | 9/2004 | Heckerman et al. |
| 2005/0187976 A1* | 8/2005 | Goodman et al. .......... 707/104.1 |
| 2005/0289062 A1* | 12/2005 | Hori et al. ........................ 705/51 |
| 2006/0242147 A1* | 10/2006 | Gehrking et al. ................. 707/7 |
| 2007/0185901 A1* | 8/2007 | Gates ............................ 707/102 |
| 2008/0120292 A1* | 5/2008 | Sundaresan et al. .............. 707/5 |

OTHER PUBLICATIONS

Commonly-owned U.S. Appl. No. 11/693,063, filed Mar. 29, 2007.
Commonly-owned U.S. Appl. No. 11/694,821, filed Mar. 30, 2007.
Wikipedia web page titled "Vertex cover problem" printed from http://en.wikipedia.org/wiki/Vertex_cover_problem, last modified on May 3, 2008.

* cited by examiner

*Primary Examiner* — Uyen Le
(74) *Attorney, Agent, or Firm* — Knobbe, Martens, Olson & Bear LLP

(57) ABSTRACT

A computer-implemented process for reducing category overlap obtains a set of source items and an initial set of item categories associated with the source items. An assessment of the overlap between different item categories in the initial set of item categories is used to selectively eliminate one or more item categories prior to presentation of the source items and associated categories to the user, thereby resulting in reduced overlap between the item categories presented. The resulting set of categories improves the ability of the user to efficiently and effectively access source items of interest, such as recommended items generated by a recommendation engine.

26 Claims, 7 Drawing Sheets

AUTOMATED SELECTION OF ITEM CATEGORIES FOR PRESENTING ITEM RECOMMENDATIONS

BACKGROUND

An immense amount of information is being created and made available for users to access via electronic communications systems. Such information includes, for example, search result listings from search engines, the contents of electronic product catalogs, and postings on commercial blogs, personal blogs, and social networking sites. There is so much information available that it is impossible for an individual to read more than a tiny fraction of the whole.

To help address this problem, websites and other types of information systems often organize information into categories that are intended to facilitate a user's ability to navigate to and access the information of particular interest to a user. A blog discussing computer programming issues, for example, may provide access to the blog's postings through links to categories with descriptive names such as, "Java", "Ruby", "Ruby on Rails", "Artificial Intelligence", "Lisp", "Perl", "Python", "Web Applications", "AJAX", "Search", "Javascript", "Object Mapping", "Smalltalk", "Seaside", "Squeak", "Semantic Web" and "Data Mining." Likewise, e-commerce websites and other types of interactive systems may also implement recommendation services that recommend items stored or represented in a data repository. These services can operate, for example, by receiving an input list of items (possibly with associated item weights), and by outputting a ranked list of items that are deemed to be collectively similar or related to the input set. To assist a user (and potential buyer) of the e-commerce website, these recommended items may be organized into groups and presented to the user through descriptively named categories.

The categories presented to a user sometimes includes significant redundancy between the categories. For example, a posting from the illustrative computer programming blog mentioned above may be accessible via many different categories depending upon its content. Likewise, a recommended DVD from an e-commerce website may be accessible via several different categories presented to the user, the different categories reflecting different attributes of the DVD. The film "Blade Runner", for example, may be among a list of recommended items presented to the user via descriptively named categories. "Blade Runner" may be presented to the user through many different categories, such as the film genres "Science Fiction", "Action", "Thriller", and "Drama" and other categories such as "Harrison Ford" (the lead actor), "Ridley Scott" (the director), and "Philip K. Dick" (the author of the science fiction novel from which the screenplay was written).

The existence of redundancy in presenting information to a user can significantly hinder the ability of the user to efficiently locate and access the information of interest to the user. By presenting the same information to a user many times in different categories, a user reading through the categories is forced to spend time rereading information that he or she has already reviewed. Furthermore, the user is required to navigate through more entries (e.g. lists, links, scroll arrows, etc.) to access new and fresh information that may be of greater interest. This problem can become severe given the limited amount of space available to display information on common user interface displays. If the redundancy within different categories presented to a user is too onerous or annoying, the user may lose patience, become frustrated, and cease searching entirely.

BRIEF DESCRIPTION OF THE DRAWINGS

Specific embodiments will now be described with reference to the drawings, which are intended to illustrate and not limit the various features of the invention.

DETAILED DESCRIPTION OF SPECIFIC EMBODIMENTS

Different computer-implemented processes will now be described for presenting to a user a subset of item categories that contain source items of interest to the user. As described below, the subset of item categories presented to the user comprises a portion of a larger, full set of overlapping item categories containing source items of interest to the user. By "overlapping", it is meant that some or all of the item categories share source items in common. The processes discussed below provide methods for selectively filtering out certain item categories so as provide to the user, after filtering, with a subset of item categories that, collectively, contain less redundancy of source items between the various item categories. That is, a user navigating through the categories is less likely to encounter the same source item over and over again.

Figure 1:
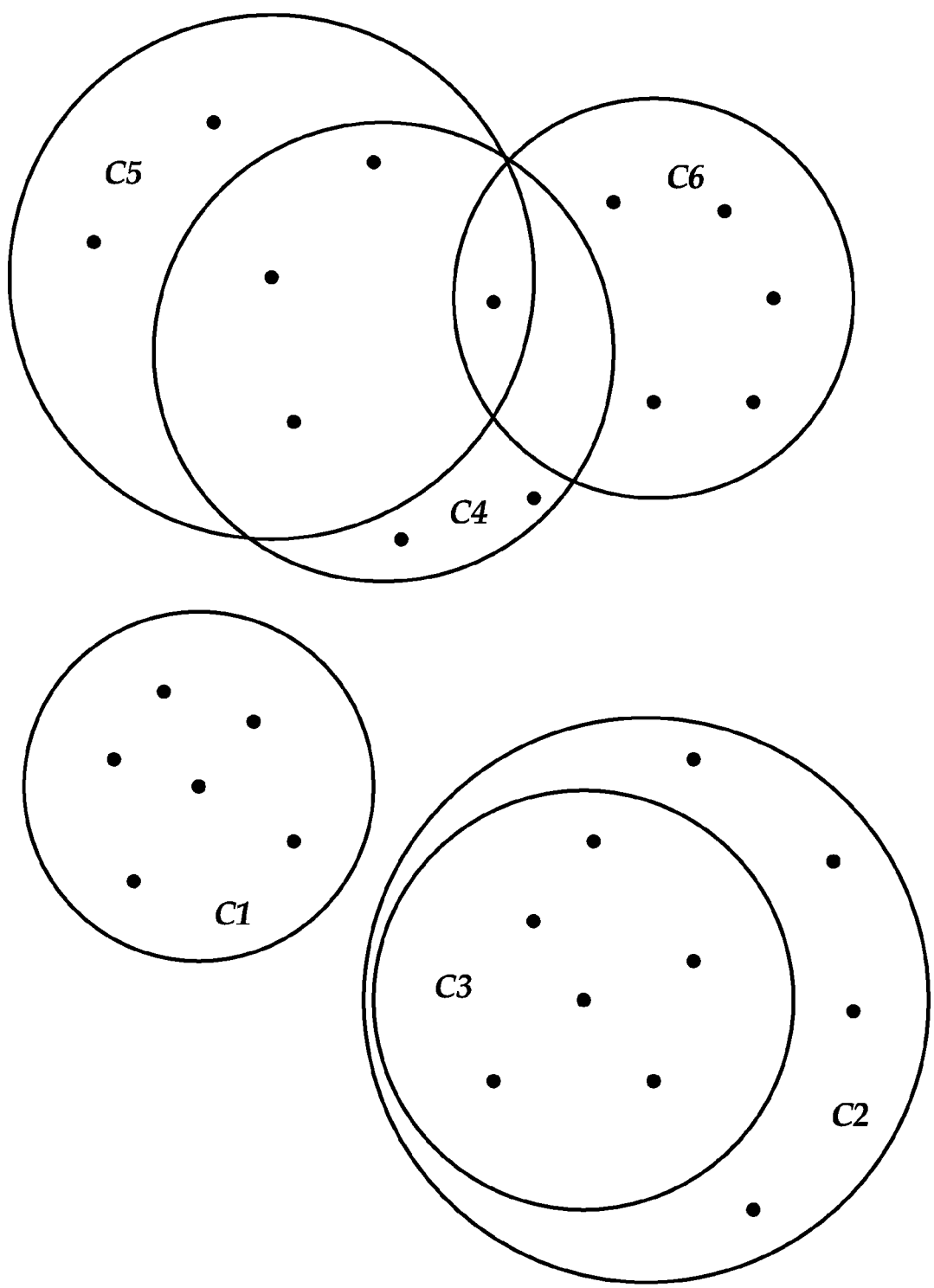
FIG. 1 illustrates a representation of items of information distributed within a set of item categories.

FIG. 1 illustrates a collection of source items, shown as twenty-nine dots, organized into six item categories, C1-C6. Source items may include, for example, physical products (new and/or used), newspaper or journal articles, blog postings, music files, software downloads, social networking postings, social dating postings, job listings, stocks and bonds, online auctions, and/or any other type of item commonly represented within an electronic catalog and organized by category. Depending on the context of its use, the term "source item" may refer to an item itself (e.g., a product that may be purchased or a blog posting that may be accessed), or to an identifier or other representation of that source item in a computer (e.g., a product or blog posting identifier or description stored in a database). In some cases, the term may be used collectively to refer to both.

The twenty-nine dots in FIG. 1 may be considered to represent the total number of source items determined to be of interest to a user. Those particular source items, for example, may represent twenty-nine distinct products recommended by an e-commerce site based on the user's past buying and browsing history. Each of the item categories, C1-C6 represents an organization scheme that establishes a relationship between the various source items included within the boundaries of the item category. Item category C1, for example, may represent books by science fiction author Philip K. Dick. The six dots within C1 may represent six books authored by Mr. Dick, such as "Do Androids Dream of Electric Sheep?", "Dr. Bloodmoney, or How We Got Along After the Bomb", "The Game-Players of Titan", "The Simulacra", "The Crack in Space", and "Now Wait for Last Year", each of these books having been recommended to the user based on his or her prior activity on the e-commerce site.

As shown in FIG. 1, item categories C2 and C3 coexist in a nested fully overlapping relationship, such that item category C3 (containing six source items of interest) is wholly subsumed by item category C2 (containing ten source items of interest). Such a relationship can occur between item categories when, for example, the item categories are organized into a hierarchical structure. The broader item category C2, for example, may include ten books relating to photography (deemed to be of interest to the user), while the narrower item category C3 may include six books that relate specifically to digital photography. As shown in FIG. 1, item categories C4, C5 and C6 coexist in partially overlapping relationships, such that item categories C4 and C5 share four source items in common, item categories C4 and C6 share one source item in common, and item categories C5 and C6 have one source item in common. Item category C1 has no source items in common with the other item categories shown.

The six item categories depicted in FIG. 1 may be presented to a user on a user interface (for example, through a hyperlink) to assist the user in finding products he or she may be interested in purchasing. As discussed above, C1, C2, and C3 may represent "Books by Philip K. Dick", "Books on Photography", and "Books on Digital Photography", respectively. Categories C4, C5, and C6 may represent the item categories "Adventure DVDs", "Science Fiction DVDs", and "Thriller DVDs", respectively. One problem with presenting this set of six item categories, readily apparent from FIG. 1, is that the set of categories provides the user with significant redundancy of source items. If the user accesses item category C5, for example, after having already reviewed the source items in category C4, the user will mostly encounter source items that he or she has already seen. As such, the existence of both item categories C4 and C5 on the recommendation page lowers the page's effectiveness in providing the user with useful recommendations of possible products to purchase.

Figure 2:
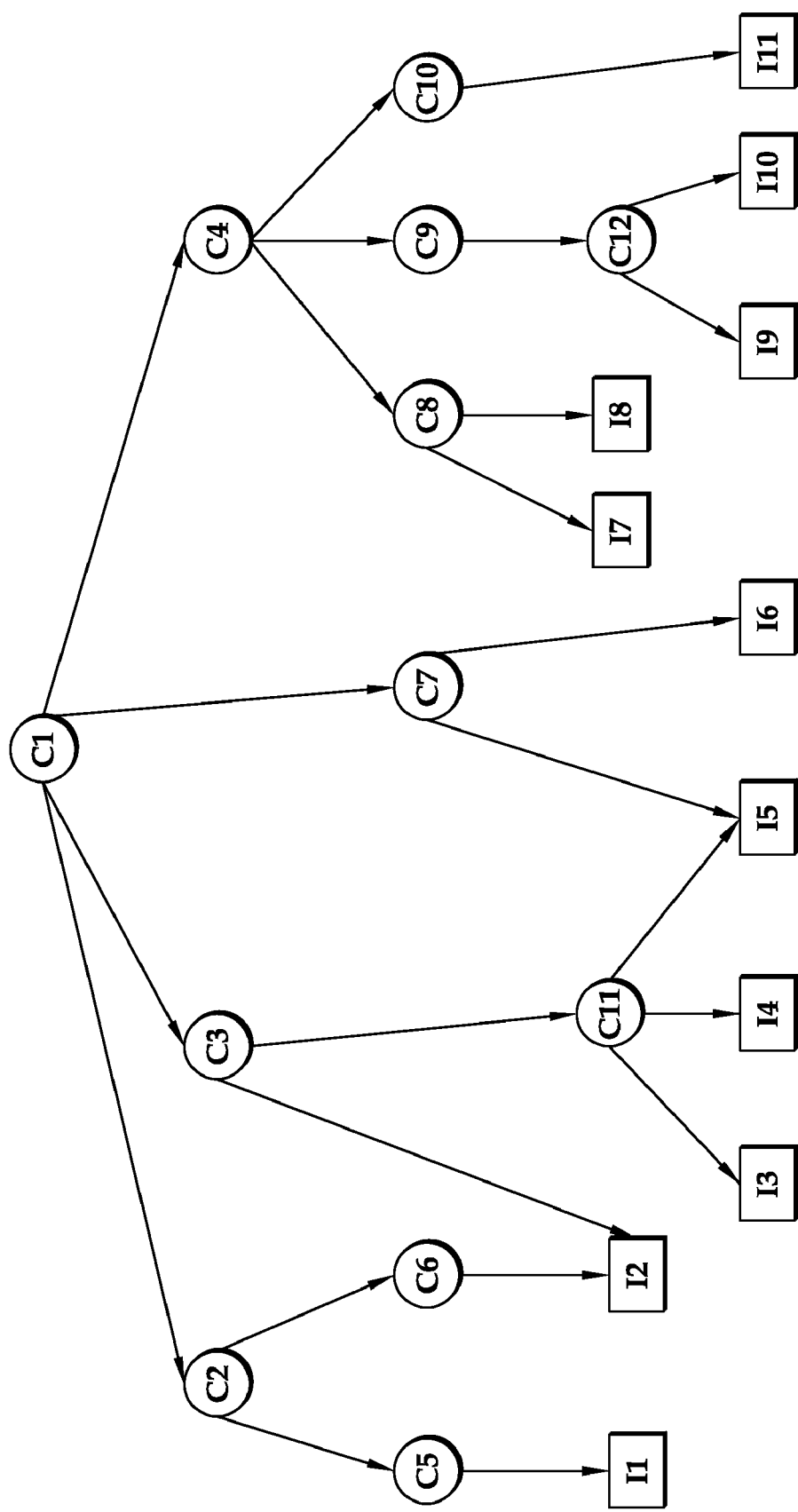
FIG. 2 illustrates an example hierarchical browse structure.

FIG. 2 illustrates one of many possible organizational structures that may result in substantial overlap between item categories, as discussed above. FIG. 2 depicts a "browse tree" in which the items of an electronic catalog are arranged within categories and subcategories. The electronic catalog may be part of a website system, or may be implemented in a variety of other platforms that support interactive browsing, such as, for example, an interactive television system or an online services network. In the example illustrated, the browse tree consists of twelve item category nodes C1-C12 and eleven source item nodes I1-I11. A much greater number of item category nodes and source item nodes may be provided, with hundreds or thousands of categories, and thousands or millions of source items. The browse tree shown in FIG. 2 is in the form of a directed acyclic graph, in which a child node may have multiple parent nodes. A browse tree may also have a pure tree structure in which each child node has only one immediate parent node, or any other suitable organizational structure. The items need not all fall at the same level of the browse tree; for example, some items may be closer to the root node (C1) than others.

One way for a user to find source items of interest is to navigate a browse tree. For example, a user may make a series of selections through the browse tree of FIG. 2, such as from item category C1 (e.g., DVDs) to item category C3 (e.g., DVDs—Adventure) to item category C11 (e.g., DVDs—Adventure—Harrison Ford), ultimately accessing source item I3 (e.g., the movie, "Blade Runner"). The item categories C1, C3, and C11 all share in common the source item I3, as well as the source items I4 and I5. As shown in FIG. 2, there is substantial sharing of items between categories, with, for example, item categories C1, C4, C9, and C12 all sharing in common the source items I9 and I10.

Several different computer-implemented processes will now be described for presenting to a user a set of item categories whereby the redundancy created by shared source items between item categories is reduced. For purposes of illustration, the processes are described primarily in the context of a system that recommends electronic catalog items to users of a network accessible e-commerce site. As will be apparent, however, the disclosed processes can also be used to recommend other types of items, such as but not limited to social networking postings, news articles, blogs, travel destinations, service providers, other users, and events. In addition, the disclosed processes need not be implemented as part of, or in conjunction with, a website. Furthermore, the specific processes and components described in the following sections represent specific embodiments, and are presented by way of example. As such, nothing in this description is intended to imply that any particular feature, step, characteristic or component is essential.

Figure 3:
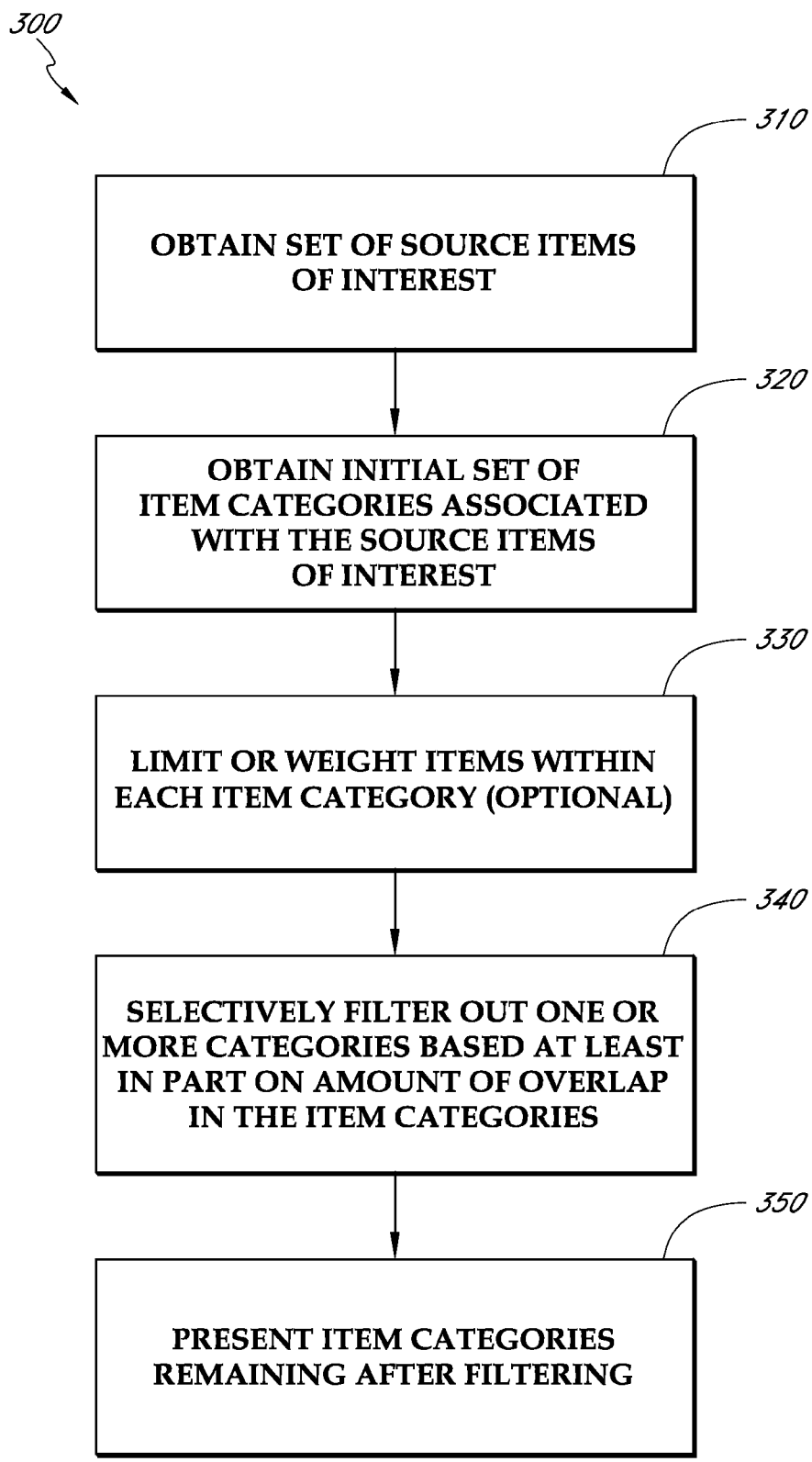
FIG. 3 illustrates a process for presenting item categories with reduced redundancy of source items.

FIG. 3 illustrates a generalized sequence of steps 300 that may be performed by a computer system, such as one or more physical servers of a website system, to implement a process of presenting a subset of item categories to a user. As depicted by block 310, a set of source items of interest is obtained. This set of source items of interest may be received, selected or generated through any process or method capable of obtaining a set of items of interest. As used herein, the term "interest" is used broadly, and may refer to source items that are deemed relevant to the user for any reason.

The set of source items of interest to a user, for example, may consist of a set of recommended products or other items generated from the user's historical behavior (and/or the collective behavior histories of a general population of users) in rating, browsing, or purchasing related products, such as is described in U.S. Pat. No. 6,912,505, entitled "Use Of Product Viewing Histories Of Users To Identify Related Products", and in U.S. Pat. No. 6,317,722, entitled "Use of Electronic Shopping Carts to Generate Personal Recommendations", the disclosures of which are hereby incorporated by reference. The set of source items may include a ranking that reflects the degree of interest. That is, the complete set of N source items may be expressed as a list, I1, I2, I3 . . . IN, where I1 is the source item of perceived greatest interest, I2 has the second highest ranked level of interest, and so on.

As depicted in block 320, the computer system may then obtain a set of item categories associated with some or all of the source items of interest obtained in block 310. This receiving, selecting, or generating of the set of item categories may be done using any approach to categorization, wherein affiliations are created between at least some of the source items of interest and a plurality of categories. It is contemplated that the set of categories obtained in block 320 will be overlapping to some degree, such that some of the source items of interest are included within more than one item category. Some categories in the set may have no overlapping (such as category C1 in FIG. 1). One or more item categories in the set may be fully overlapping with other categories (such as C2 and C3 in FIG. 1) and one or more item categories in the set may be partially overlapping with other categories (such as C4, C5 and C6 in FIG. 1). The set of categories may include any combination of non-, partial-, and fully-overlapping relationships between the item categories of the set. The initial set of item categories need not be all inclusive. That is, the initial set of categories may exclude some members of the set of source items deemed to be of interest.

The initial set of item categories may be obtained, for example, by using predefined categories from an existing organizational structure, such as the exemplary browse tree shown in FIG. 2. Item categories may simply exist as node categories in a browse tree, such as category C7 in FIG. 2. Item categories may be created from combinations of node categories, such as a merging of categories C5 and C12 in FIG. 2. Item categories may have names assigned to them before and/or after they are included in the initial set of item categories. Item categories may be obtained using category names and/or source item names, by looking for descriptive and/or informative characters, words or phrases. Item categories may be created by merging node categories with the same or similar names, such as "basketball", "basketballs", "basket ball" and "basket balls".

In one embodiment, blocks 310 and 320 are merged. That is, a set of source items may be generated, selected or obtained that is already categorized into an initial set of item categories, such that the source items are associated with one or more item categories.

In block 330, the individual source items within the item categories generated, selected, or obtained in block 320 may be limited in number and/or assigned weightings that will be subsequently used when assessing the amount of overlap between different item categories. For example, the list of items within a given item category may be truncated to include only the top entries (in a ranking of perceived interest) up to a maximum of five source items. Alternatively, the source items within a given item category may be assigned different weightings. As an example, the top-ranked source item in the category (using a ranking of perceived interest) may be assigned a weighting of 1.0, the second-ranked source item may be assigned a weighting of 0.9, the third-ranked source item may be assigned a weighting of 0.8, and so on. Weightings and truncation can both be applied. The block 330 may be unnecessary depending upon the details of the process applied in block 320. That is, the obtaining of categories in block 320 may already incorporate weightings, list truncation, or other methods that preclude the need for additional processing of the source items.

In block 340, the resulting item categories are processed to filter out one or more categories based at least in part on an assessment of the overlap between item categories, such that item categories are selectively removed to eliminate occurrences of overlap. This may be accomplished in numerous ways. As one example, a quantitative overlap score may be generated for each case of overlap between two item categories, with the resulting overlap scores used to identify a particular item category that, upon removal, eliminates the most egregious overlap. The overlap scores between two subject item categories may also be based on a variety of other factors, including some or all of the following: (1) the number of source items in each of the categories, (2) the number of source items shared in common between the categories, (3) the rankings of the source items in each of the categories, (4) the rankings of the source items shared in common between the categories, (5) the nature of the overlap (partial versus full), (6) other weighting factors applied to favor or disfavor particular source items and/or item categories (based on user interests, sponsorship, special promotions, etc.).

As an example, applying block 340 to the initial set of item categories presented in FIG. 1 (C1-C6) may filter out item category C2 due to the overlap with C3, and may further filter out category C4 due to the overlap with C5 and C6. Such filtering would result in a remaining set of four item categories, C1, C3, C5 and C6, with C1 and C3 having no overlap with other categories, and with C5 and C6 sharing one source item in common. As suggested by this example, Block 340 need not remove all overlap between categories. In many instances, removal of all overlap in item categories is undesirable as it removes too many categories, hindering the ability of a user to identify and access source items of interest. Note that the filtering of block 340 may result in the removal of some source items. For example, the filtering out of C2 (discussed above) results in the removal of four source items in C2 that are not overlapped with the remaining category C3. Optionally, certain source items of high interest may be weighted or otherwise flagged to prevent their exclusion through the filtering process of block 340. This may be accomplished by, for example, rendering an item category immune from removal if it becomes the last category remaining that includes one or more source items of high interest.

The block 340 need not make its filtering decisions based solely on assessments of overlaps. The overlap analysis may be supplemented by other processes dependent upon other criteria, as well. For example, an item category may be immune from filtering in block 340 regardless of the amount of overlap with other categories because it corresponds to a featured or sponsored topic (as set by the host of the electronic catalog). On the other hand, an item category may be eliminated despite little or no overlap with other categories, because it corresponds to a disfavored topic (as viewed by the host of the electronic catalog), or contains disfavored source items.

In block 350, the source items are presented to the user as arranged by the item categories that remain following block 340. This may be accomplished in various ways. For example, the item category names can be presented in a text cloud interface in which category names are displayed as selectable links to the corresponding list of items. Alternatively, the source items may be displayed in a list format with item category names as headings.

Figure 4:
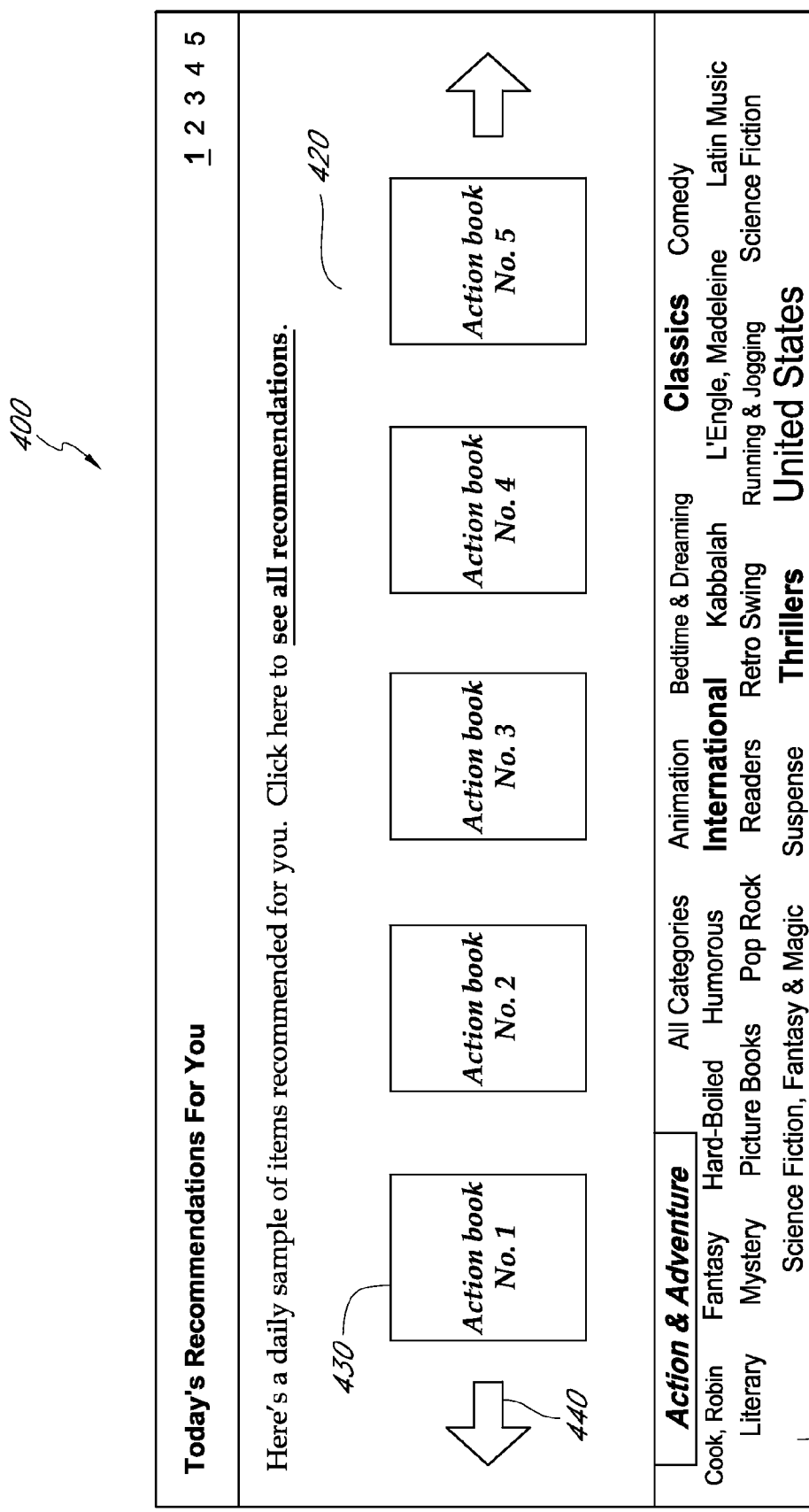
FIG. 4 illustrates a portion of a user interface showing an example text cloud interface that may be used to organize a set of recommended source items into categories.

FIG. 4 is a user interface illustrating one example of a text cloud interface 400 that may be used to present item categories to a user. In this example, the text cloud interface 400 is divided into a lower portion 410 and an upper portion 420. Images 430 and titles (not shown) of five recommended source items are displayed in a scrollable format in the upper portion 420 of the display. Additional recommended source items may be accessed using Arrows 440 (left and right) that allow horizontal scrolling. The lower portion 410 provides names of item categories. If the user wishes to filter the source item recommendations by item category, the user may click on one of the category names (e.g., "Action & Adventure" or "Humorous") in the lower portion 410. For example, if a user clicks on Action & Adventure in the lower portion 410, the upper portion 420 will be updated to show only the source items that fall within the Action & Adventure category. With the exception of "All Categories", each category name/link corresponds to a particular item category remaining after the filtering of block 340.

Optionally, the text size of the category names presented in the lower portion 410 is sized to designate the relevance of the category, with a larger text size designating an item category of higher relevance. The relevance of a category may be based on the number of source items it contains, or it may be based on some other criteria, such as the cumulative interest of the user in the top five source items included in the category. Additional features may be included in the presentation of text clouds.

The entire process depicted in FIG. 3 may optionally be performed in real time in response to a user request for source items of interest (e.g., a request for product recommendations). For example, the process may be executed when a user clicks on a link which reads "view your recommendations", or when the user accesses a particular page that is configured to display personalized recommendations.

Figure 5:
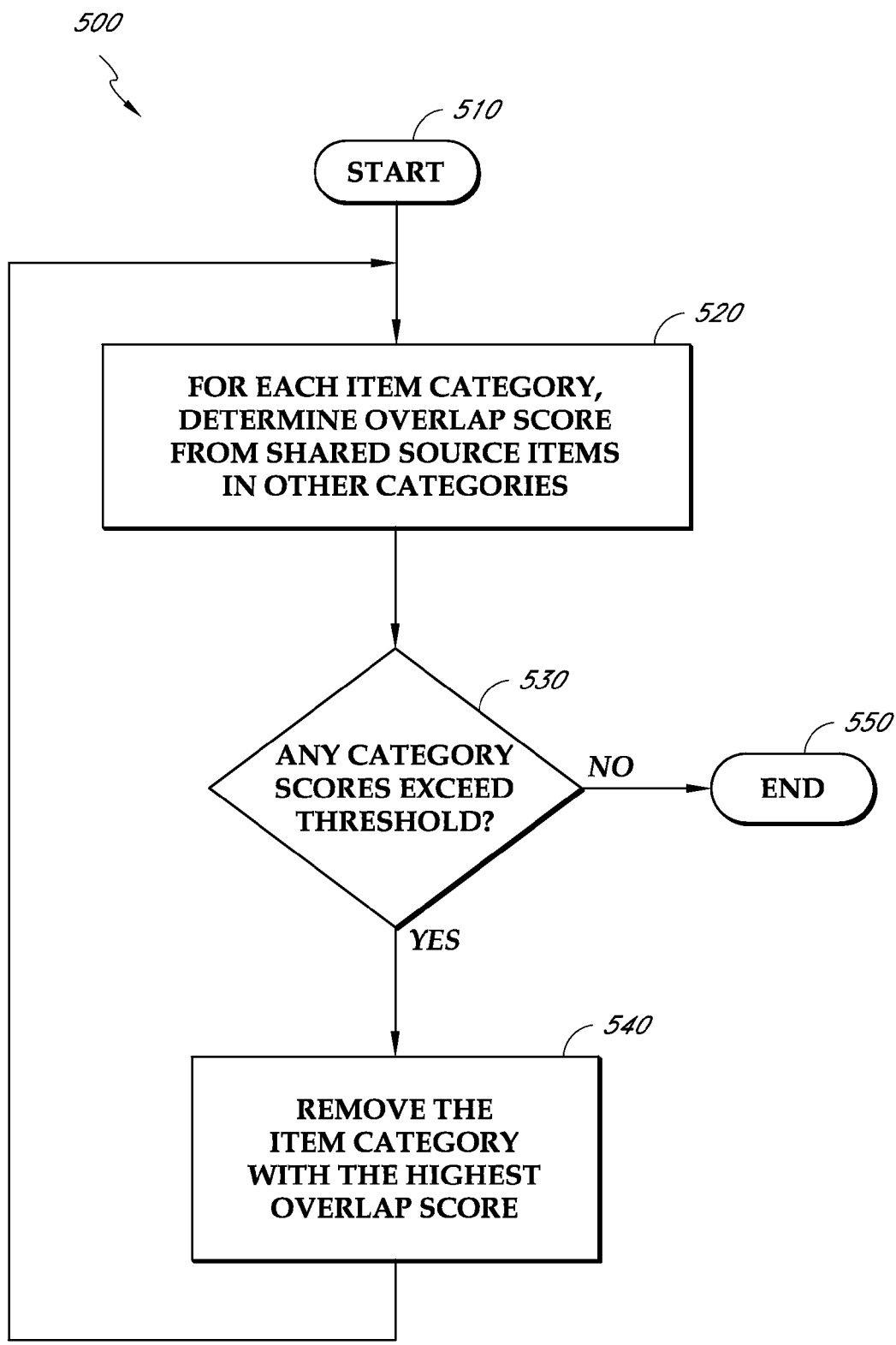
FIG. 5 illustrates a process for generating a set of item categories with reduced redundancy of source items.

FIG. 5 illustrates one embodiment of a process 500 for selectively filtering item categories based on overlap (block 340). As illustrated, the process begins at block 510, which corresponds to the process point in FIG. 3 at the beginning of block 340. At this point, an initial set of item categories associated with the source items of interest has already been generated (block 320). Using FIG. 1 as an example, the initial set of item categories may consist of the six categories C1 through C6.

At block 520, an "overlap score" is determined for each item category in the set. The overlap score is a quantitative measure of overlap (derived from shared source items) between the subject item category and other item categories in the set. The overlap score may be cumulative in nature, and include contributions from all item categories for which a subject category shares source items. Alternatively, the overlap score may include contributions from some, but not all, other item categories with shared source items. One embodiment for calculating an overlap score for an item category will be discussed below in connection with FIG. 6.

After the analysis of block 520 has been applied to the initial set of item categories, each category will have an associated overlap score. Again using FIG. 1 as an example, Table 1 below shows exemplary overlap scores for the categories.

TABLE 1

| Initial Set of Item Categories | Overlap Scores |
| --- | --- |
| C1 | 0 |
| C2 | 2.5 |
| C3 | 1.6 |
| C4 | 1.4 |
| C5 | 1.2 |
| C6 | 0.4 |

In block 530, the overlap scores of the individual item categories are compared to an "overlap threshold." The overlap threshold is a quantitative measure that delineates acceptable levels of overlap from unacceptable levels of overlap. Adjusting the threshold to different levels changes the tolerance for overlap. A higher threshold results in more categories and more source item overlap between categories; a lower threshold results in less categories and less overlap. Different thresholds are likely to be used for different situations, depending upon the number and nature of source item categories and the number, size, and nature of the associated item categories. In many instances, trial and error adjustment may be used to find a threshold level that provides an effective presentation of categories with acceptably low amounts of overlap between categories. For our FIG. 1 example, an overlap threshold of 1.0 will be applied.

Referring again to block 530, if no item categories have overlap scores that exceed the overlap threshold, the process passes to block 550, which corresponds to the end of the filtering process. This point corresponds to the process point in FIG. 3 immediately following block 340. If, on the other hand, one or more item categories have overlap scores that exceed the overlap threshold, the process passes to block 540. Referring again to the FIG. 1 example (and Table 1 above), four of the six item categories have overlap scores that exceed the overlap threshold. Accordingly, the process passes to block 540.

In block 540, the item category with the largest overlap score is removed from the set of item categories. For the FIG. 1 example, item category C2 has the largest overlap score and is thus removed from the set. Following this removal, the set of item categories now includes C1, C3, C4, C5 and C6.

Following block 540, the process returns to block 520, where new overlap scores are determined for the remaining categories in the (now smaller) set. Table 2, below, shows the overlap scores for the set of categories following the filtering out of C2.

TABLE 2

| Remaining Set of Item Categories | Overlap Scores |
| --- | --- |
| C1 | 0 |
| C3 | 0 |
| C4 | 1.4 |
| C5 | 1.2 |
| C6 | 0.4 |

A comparison of Tables 1 and 2 reveals that the overlap scores for item categories C1, C4, C5 and C6 remain unchanged by the filtering out of C2. The overlap scores for these four categories remained the same (in this embodiment) because C2 did not overlap with those categories. Preferably, overlap scores for categories that do not overlap a removed category (in this case C1, C4, C5, and C6) may be cached from earlier calculations (rather than recalculated) to improve computing efficiency. In other words, new overlap scores need only be calculated for those categories that overlapped with the removed category (in this case, C3).

After the overlap scores have been determined for the new set, the process passes once again to block 530, where it is determined that two categories have overlap scores that exceed the overlap threshold of 1.0 (see Table 2). The system thus passes once again to block 540, where the item category with the largest overlap score, C4, is removed.

The process returns once again to block 520, where new overlap scores are determined for the remaining categories in the set. Table 3, below, shows the overlap scores for the set of categories following the filtering out of C4.

TABLE 3

| Remaining Set of Item Categories | Overlap Scores |
| --- | --- |
| C1 | 0 |
| C3 | 0 |
| C5 | 0.3 |
| C6 | 0.2 |

The process then passes once again to block 530, where it is determined that no categories have overlap scores that exceed the overlap threshold of 1.0 (see Table 3). The system thus passes to block 550, where the category filtering ends. At this point, the process passes to block 350 in FIG. 3, where the remaining item categories C1, C3, C5 and C6 are presented to the user, optionally using the text cloud interface 400.

Figure 6:
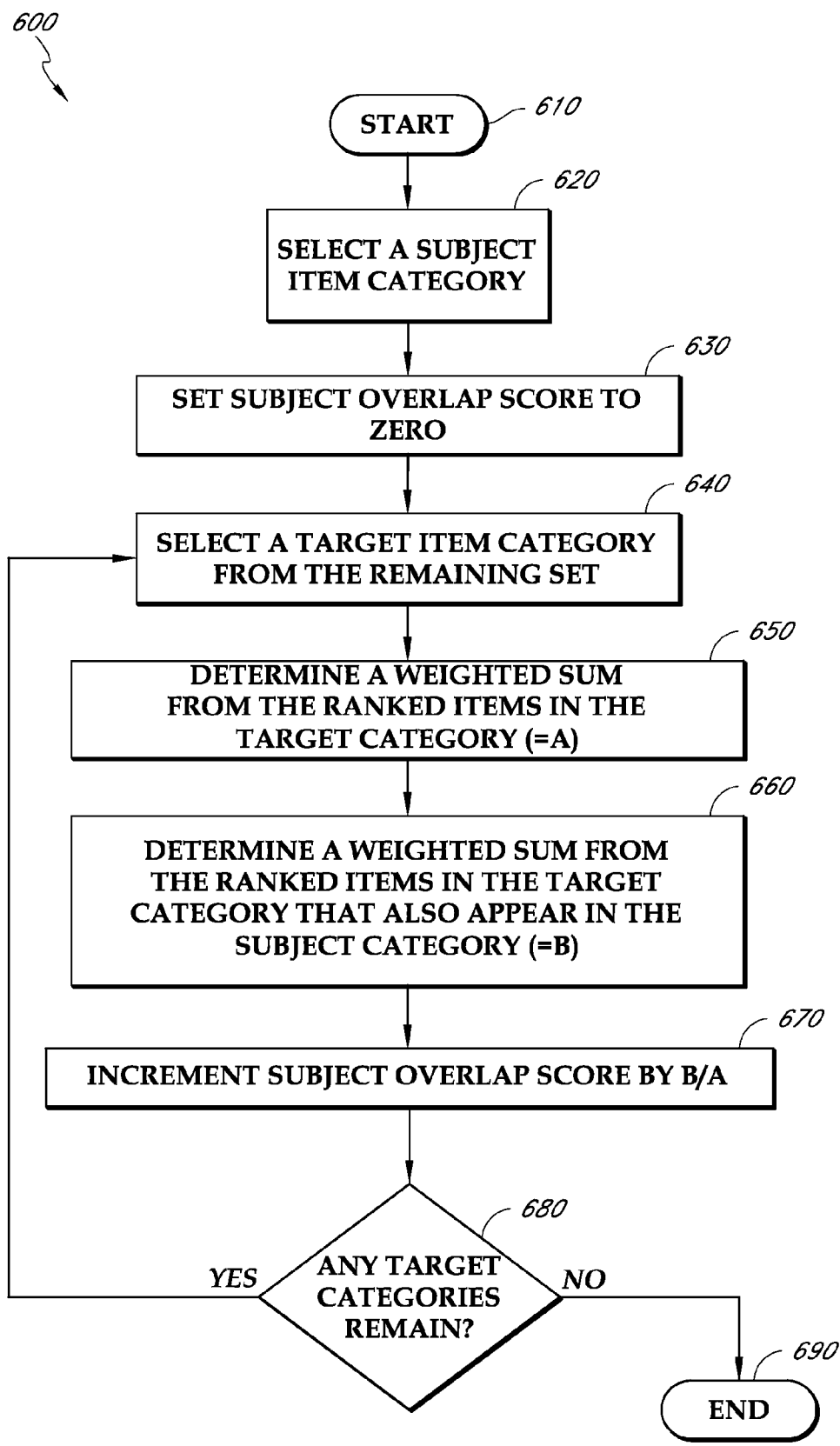
FIG. 6 illustrates a process for removing categories to reduce redundancy of source items between item categories.

FIG. 6 illustrates one embodiment of a process 600 for calculating an overlap score for a subject item category. The process 600 is repeated for each of a plurality of item categories in block 520 of FIG. 5. The process begins at block 610 and passes to block 620 where a subject item category is selected from the complete set of categories. In block 630, the overlap score for the subject item category is initialized to zero.

In block 640, a "target" item category is selected from the remaining set of item categories. As shown in FIG. 6, block 640 begins a loop that will cycle through a plurality of target item categories, each selected from the remaining set of item categories. In one embodiment, each category in the set other than the subject category (selected in block 620) will, in turn, become a target category in the process 600. Alternatively, to improve computing efficiency, target item categories may be limited to those categories (other than the subject category) that overlap with the subject category. Other criteria may also be used to define which categories become target categories, as well, such as category attributes, sponsorship, or favored or disfavored status as set by the user or host.

In block 650, a weighted sum (="A") is calculated from the ranked source items in the target item category. Consider an exemplary target item category, C1, containing seven source items with the following rankings: I2, I4, I5, I6, I8, I9, and I10. In one embodiment, a weighting of 1.0 is applied to the top five ranked source items and a weighting of 0 is applied to all lower ranked source items. In this embodiment, C1 can be represented as the set {I2, I4, I5, I6, I8, I9, I10}, where the top five items (I2, I4, I5, I6, and I8) receive a weighting of 1.0 and the remaining items (I9 and I10) receive a weighting of 0. The weighted sum for C1 is then A=1+1+1+1+1+0+0=5. In effect, this embodiment provides a step-function weighting factor with the transition from 1 to 0 after five items. In other embodiments, non-step function weighting factors may be applied to the ranked list of items, such as weighting factors that fall off exponentially, linearly, or in some other manner.

In block 660, a weighted sum (="B") is calculated from those ranked source items in the target item category that are shared with the subject item category. Consider an exemplary subject category, C2, containing three source items with the following rankings: I1, I4 and I6. C2 can be represented as the set {I1, I4, I6}, where the top five ranked items (in this case, three items, I1, I4 and I6) receive a weighting of 1.0 and the remaining items (in this case, the null set) receive a weighting of 0. Comparing C1 and C2 reveals the following common source items:

C1 (target): {I2, I4, I5, I6, I8}
C2 (subject): {I1, I4, I6}
Intersection of C1 and C2: {I4, I6}

The weighted sum (assuming an equal weighting of 1 for all items) is then B=1+1=2.

In block 670, the overlap score for the subject category is incremented by an incremental overlap score contribution for the target item category. In one embodiment, the incremental overlap score contribution is the ratio B/A. Alternatively, the incremental overlap score contribution can be weighted differently for different target categories. In the example above, the overlap score, initially zero, is incremented by 2/5=0.4. Thus, because of the overlap between target category C1 and the subject category C2, the overlap score of the subject item category has grown from 0 to 0.4.

In block 680, the system checks to see whether any item categories remain that may contribute to the overlap score of the subject category (i.e., that overlap with the subject category). Referring back to the example of FIG. 1, when C4 is the subject category, the process 600 (generating an overlap score for C4) will loop through the blocks 640 through 670 for each of the overlapping "target" categories C5 and C6 (picking up overlap contributions from each). Likewise, when C5 is the subject category, the process 600 (generating an overlap score for C5) will loop through the blocks 640 through 670 for each of overlapping target categories C4 and C6. And, when C6 is the subject category, the process 600 (generating an overlap score for C6) will loop through the blocks 640 through 670 for each of overlapping target categories C4 and C5.

When all target categories that overlap the subject category have been analyzed by blocks 640 through 670, it is determined at block 680 that no target categories remain, the process 600 advances to block 690 and terminates. At this point, the overlap score of the subject category has been incremented by contributions from each overlapping category (step 670).

At this point, the process advances to the next item category (see block 520 in FIG. 5), where the process 600 is repeated for the new "subject" category.

To further show the processes of the embodiment shown in FIGS. 5 and 6, consider Table 4, below, which shows an example set of source items arranged into four categories.

TABLE 4

| Category | Name | Source Items |
| --- | --- | --- |
| C0 | All Categories | I1, I2, I3, I4, I5, I6, I7, I8, I9, I10 |
| C1 | Literature and Fiction | I2, I4, I5, I6, I8, I9, I10 |
| C2 | African Literature | I1, I4, I6 |
| C3 | World Fiction | I2, I3, I5, I8, I9 |

The top five source items in each category are in bold because they are the only items that will be compared when calculating overlap scores through the analysis in blocks 650, 660, and 670 (i.e., a step-function weighting cut-off after the top five source items). For this example, the source items I1, I2, ... I10 comprise the set of source items of interest to the user (see block 310). The categories C1, C2 and C3 constitute the initial set of item categories ("Literature and Fiction", "African Literature" and "World Fiction") that have been generated for the source items of interest (see block 320). The category C0 is a special category, "All Categories", that merges together all of the initial set of item categories. The category "All Categories" may participate in the process 600 as a "target" category, it preferably does not participate as a "subject" category, and therefore is not filtered out. All Categories can provide a catch-all category that provides users with the opportunity to see all source items at once. An All Categories link is included, for example, in lower portion 410 of FIG. 4.

With reference to process 500, an overlap score must be calculated for each of categories C1, C2 and C3 (see step S20). The process 600 is used to calculate the individual overlap scores. Consider C1 as the first subject item category of process 600. Table 5, below, shows the calculations within process 600 that generate an overlap score for C1 based on the other categories C0, C2 and C3.

TABLE 5

| Block | Calculating an overlap score for C1 | | |
| --- | --- | --- | --- |
| 640 | Select target C0 | Select target C2 | Select target C3 |
| 650 | C0 {I1, I2, I3, I4, I5} | C2 {I1, I4, I6} | C3 {I2, I3, I5, I8, I9} |
|  | A = 5 | A = 3 | A = 5 |
| 660 | {I2, I4, I5} also in C1 | {I4, I6} also in C1 | {I2, I5, I8} also in C1 |
|  | B = 3 | B = 2 | B = 3 |

TABLE 5-continued

| Block | Calculating an overlap score for C1 | | |
|---|---|---|---|
| 670 | B/A = 3/5 = 0.6 Increment overlap score from 0 to 0.6 | B/A = 2/3 = 0.67 Increment overlap score from 0.6 to 1.27 | B/A = 3/5 = 0.6 Increment overlap score from 1.27 to 1.87 |
| 680 | Yes, return to 640 | Yes, return to 640 | No, go to 690 (END) |

As shown in the table, C1 receives overlap score contributions of 0.6, 0.67, and 0.6 from C0, C2 and C3, respectively, resulting in a total overlap score of 1.87 before the process 600 terminates at block 690. Table 6, below, extends this analysis to C2 and C3, and shows the resulting overlap scores for all three categories.

TABLE 6

| Category | Initial overlap scores |
|---|---|
| C1 | 1.87 |
| C2 | 0.8 |
| C3 | 1.2 |

The above overlap scores are "initial" in that they apply before any filtering has taken place, that is, after one pass through block 520 of FIG. 5. Process 500 advances from block 520 to block 530, and using an overlap threshold of 1.0, it can be seen that two categories (C1 and C3) have overlap scores that exceed the threshold. At block 540, the category with the highest overlap score (C1) is removed. The filtering out of C1 results in a new (smaller) set of categories, shown below in Table 7.

TABLE 7

| Category | Name | Source Items |
|---|---|---|
| C0 | All Categories | I1, I2, I3, I4, I5, I6, I7, I8, I9, I10 |
| C2 | African Literature | I1, I4, I6 |
| C3 | World Fiction | I2, I3, I5, I8, I9 |

The process 500 returns to block 520, and new overlap scores are calculated for the remaining categories C2 and C3. Once again, the process 600 is used to calculate the individual overlap scores. Table 8, below, shows the calculations that generate an overlap score for C2 based on the other categories C0 and C3.

TABLE 8

| Block | Calculating an overlap score for C2 | |
|---|---|---|
| 640 | Select target C0 | Select target C3 |
| 650 | C0 {I1, I2, I3, I4, I5} A = 5 | C3 {I2, I3, I5, I8, I9} A = 5 |
| 660 | {I1, I4} also in C2 B = 2 | {null set} also in C2 B = 0 |
| 670 | B/A = 2/5 = 0.4 Increment overlap score from 0 to 0.4 | B/A = 0/5 = 0 Increment overlap score from 0.4 to 0.4 |
| 680 | Yes, return to 640 | No, go to 690 (END) |

As shown in the table, C2 receives an overlap score contribution of 0.4 from C0, and no contribution from C3, resulting in a total overlap score of 0.4. Preferably, for computational efficiency, upon finishing the analysis of overlap between C0 and C2, block 680 would recognize that C2 and C3 have no shared source items, and the process would proceed to block 690 (END) without conducting further calculations. Table 9, below, extends the overlap analysis to category C3.

TABLE 9

| Category | Overlap scores |
|---|---|
| C2 | 0.4 |
| C3 | 0.6 |

The above overlap scores are lower than the initial overlap scores, because of the filtering out of item category C1. Process 500 advances from block 520 to block 530, and applying the overlap threshold of 1.0, it can be seen that no categories have overlap scores exceeding the threshold. Accordingly, at block 530, process 500 advances to block 550 and terminates. With reference back to FIG. 3, the process 300 advances from block 340 to block 350, where the remaining item categories C0, C2 and C3 are presented to the user, optionally using the text cloud interface 400.

Figure 7:
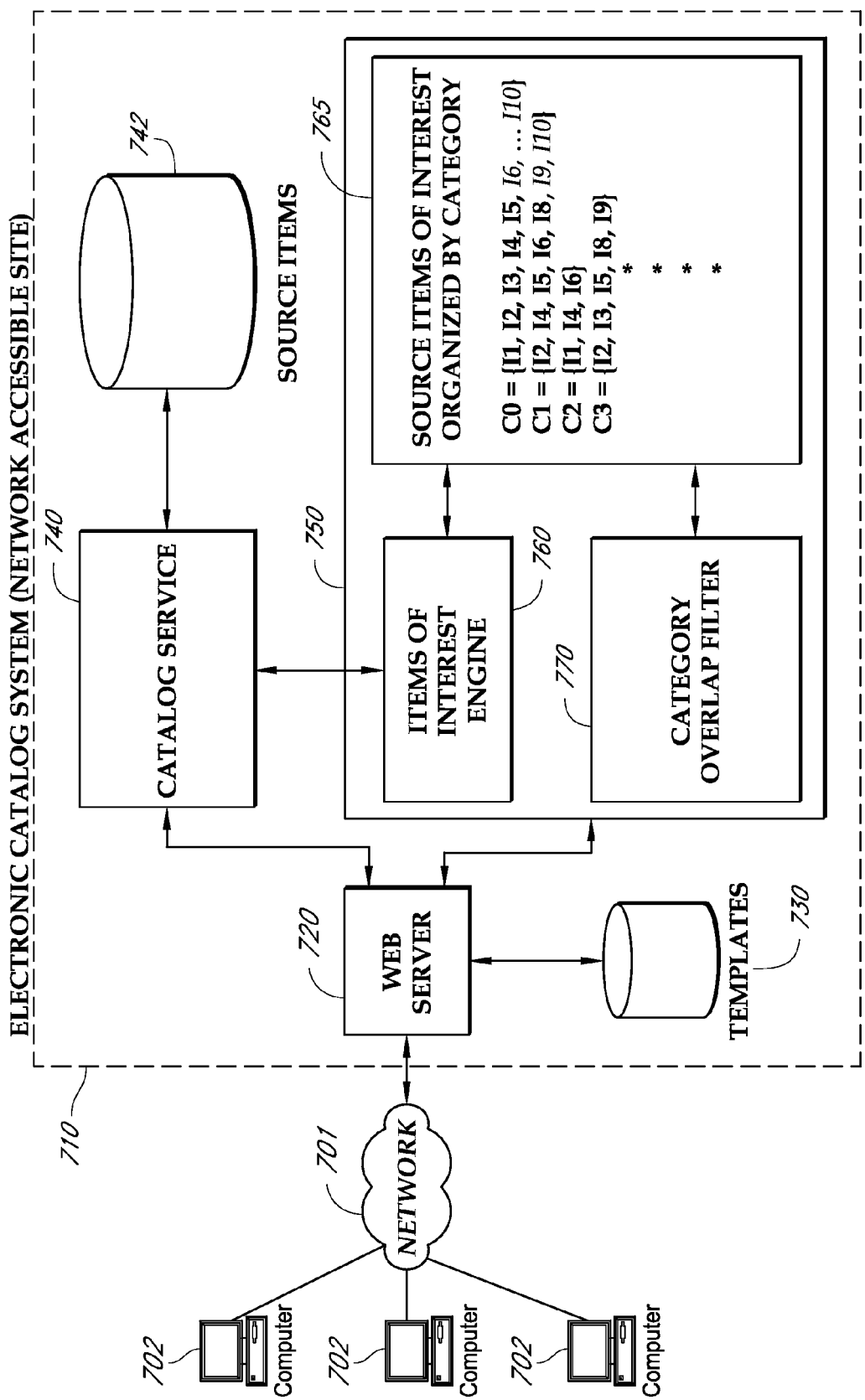
FIG. 7 illustrates one example of how the generation and presentation of categories of source items may be implemented in the context of an electronic catalog system.

FIG. 7 illustrates how the various features described above may be implemented in the context of a system that provides functionality for users to browse and access or purchase items from an electronic catalog. As will be recognized, the various features of the disclosed embodiments can be implemented in a wide variety of systems, including, e.g., auction sites, music download systems, video and DVD rental sites, product review sites, news sites, social networking sites, in-store kiosks, interactive television systems, and the like.

The system shown in FIG. 7 includes one or more web-server machines 720 that generate and serve pages of a host website 710 in response to page requests from user computing devices 702 over a network 701. The application servers 720 provide user access to a catalog of items represented in a database 742 or collection of databases. The items may include or consist of items that may be accessed or purchased via the site (e.g., book, music and video titles in physical or downloadable form; consumer electronics products; household appliances; magazine and other subscriptions, news articles, social networking postings, blog postings, etc.). The database 742 may also store data regarding how the items are arranged within a hierarchical browse structure. Data regarding the catalog items and the browse structure is accessible via a catalog service 740, which may be implemented as a web service.

The system also includes a source item list service/system 750 that generates lists of source items of interest to a user in real time in response to requests from users. The source item list service 750 may, for example, be a recommendation service that returns recommended products. The service 750 includes a source item list generation engine 760 that generates a categorized list of ranked source items 765 predicted to be of interest to a user. The source item list generation engine 760 may, for example, operate as a recommendation engine as described in U.S. Pat. No. 6,912,505, referenced above. The source item list generation service 750 further includes a category overlap filter 770 that implements some or all of the overlap reduction features described herein.

The application servers 100 use a data repository of web page templates 730 to dynamically generate web pages in response to browser requests. The templates directly or indirectly specify the service calls that are made to the services to, e.g., request data needed to generate the requested page. For instance, an appropriate template may be provided for generating the text cloud 400 shown in FIG. 4, and various other pages of the site.

When a user clicks on a link to access source items of interest (e.g. to view recommendations of products), a web server 720 requests a list of source items of interest for the user from the service 750. The service 750 then uses information related to the user (e.g., all or a portion of the user's purchase history, item ratings, and/or item viewing history) to generate a set of source items of interest. As part of this process, the source item list generation service 750 uses the category overlap reducing processes described above to selectively filter out categories prior to presenting a final set of source items and categories to the user. Specifically, the resulting source items presented to the user are organized into to a subset of categories that have been filtered to reduce overlap prior to transmission over a network 701 to the user's browser/computer 702.

Each of the processes and algorithms described above, including the service and other application components 740, 750, 760 and 770 shown in FIG. 7, may be implemented in software code modules executed by any number of general purpose computers or processors, with different services optionally but not necessarily implemented on different machines interconnected by a network. The processes and algorithms may alternatively be implemented partially or wholly in specialized computer hardware and/or application-specific circuitry. The code modules may be stored in any type or types of computer storage, such as hard disk drives and solid state memory devices. The various data repositories, such as 730 and 742, may similarly be implemented using any type of computer storage, and may be implemented using databases, flat files, or any other type of computer storage architecture. The results of the disclosed processes and process steps may be stored, persistently or otherwise, in any type of computer storage, such as those mentioned above.

Many of the processes discussed above involve calculations that may be repeated. In such instances, calculations may be cached for later use to improve computing efficiency. In some applications, the caching of calculations may be particular to a particular user or to a particular user session. In other applications, the caching of calculations may apply more generally, in which case the cached calculations may be re-used across a population of users.

The various features and processes described above may be used independently of one another, or may be combined in various ways. All possible combinations are intended to fall within the scope of this disclosure.

Although this invention has been described in terms of certain preferred embodiments and applications, other embodiments and applications that are apparent to those of ordinary skill in the art, including embodiments and applications that do not provide all of the benefits described herein, are also within the scope of this invention. The scope of the invention is defined only by the claims, which are intended to be construed without reference to any definitions that may be explicitly or implicitly included in any of the incorporated-by-reference materials.

What is claimed is:

1. A computer-implemented method of facilitating the navigation of recommended items, the method comprising:
   receiving, from a recommendation engine, an indication of a plurality of items selected by the recommendation engine to recommend to a user, said plurality of items selected by the recommendation engine based on information reflecting preferences of the user, each of the plurality of items being pre-assigned to at least one item category of a hierarchical browse structure;
   determining, based on said pre-assigned categorizations, an initial set of item categories associated with the plurality of items, each of the item categories in the initial set being associated with one or more of the plurality of items;
   selectively filtering out item categories from the initial set of item categories based at least in part on the degree to which particular item categories in the set overlap with other item categories in the set, to thereby create a subset of item categories to present to the user; and
   providing, based on the created subset of item categories, a recommendations user interface that includes functionality for the user to navigate at least a portion of the plurality of items using the subset of item categories;
   said method performed in its entirely by a computer system that comprises one or more computers.

2. The method of claim 1, wherein the item categories are selectively filtered out of the initial set based additionally on a ranking of the plurality of items.

3. The method of claim 1, wherein the degree to which particular item categories in the set overlap with other item categories in the set is determined by calculating overlap scores for particular item categories, wherein the overlap score for a particular item category depends on an extent to which the particular item category shares items with one or more other item categories in said set.

4. The method of claim 3, wherein selectively filtering out item categories from the initial set of item categories comprises iteratively removing from the set the item category having the largest overlap score.

5. The method of claim 4, further comprising ceasing the iterative removal of item categories when no item categories remain having an overlap score exceeding a threshold.

6. The method of claim 3, wherein the overlap score for a first item category is determined by summing incremental overlap score contributions of each of a plurality of other item categories that overlap with the first item category.

7. The method of claim 1, wherein selectively filtering out item categories comprises giving different non-zero amounts of weight to some of the items selected by the recommendation engine than to other items selected by the recommendation engine.

8. The method of claim 1, wherein the method is performed in its entirety in real time in response to a request from the user for item recommendations.

9. The method of claim 1, wherein the method comprises calculating said degree to which particular item categories in the initial set overlap based on the items selected by the recommendation engine, without regard to additional items falling within the initial set of item categories.

10. The method of claim 9, wherein providing a recommendations user interface comprises providing a text cloud interface in which each item category of the subset is selectable by the user to view a corresponding subset of said plurality of items.

11. A computer system, comprising:
   a recommendation engine configured to select a plurality of items to recommend to a user based on information regarding past behaviors of the user;
   a category filtering system in communication with the recommendation engine, the category filtering system configured to determine an initial set of item categories associated with the plurality of items selected by the recommendation engine, and to selectively filter out item categories from the initial set of item categories based at least in part on the degree to which particular item categories in the set overlap with other item categories in the set, to thereby create a subset of item categories to present to the user; and a server that provides a recommendations user interface that includes functionality for using the subset of item categories to interactively browse at least a portion of the plurality of items, said recommendations user interface omitting the filtered-out item categories.

12. The computer system of claim 11, wherein the category filtering system is configured to determine the degree to which particular item categories in the set overlap with other item categories in the set by calculating overlap scores for particular item categories, wherein the overlap score for a particular item category depends on an extent to which the particular item category shares items with one or more other item categories in said set.

13. The computer system of claim 12, wherein the category filtering system is configured to selectively filter out particular item categories from the initial set of item categories by a process that comprises iteratively removing from the set an item category having the largest overlap score.

14. The computer system of claim 12, wherein the category filtering system is configured to calculate an overlap score for a first item category by a process that comprises summing incremental overlap score contributions of each of a plurality of other item categories that overlap with the first item category.

15. The computer system of claim 11, wherein the category filtering system is configured to determine which item categories to filter out based in part on a ranking of the plurality of items, said ranking being specific to said user.

16. The computer system of claim 11, wherein the category filtering system is configured to give different non-zero amounts of weight to some of the items than to other items in determining which item categories to filter out.

17. The computer system of claim 11, wherein the recommendations user interface is a text cloud interface in which each item category in said subset is selectable to filter out from display items falling outside that item category.

18. Non-transitory computer storage comprising executable code that directs a computer system to perform a process that comprises:
receiving, from an items-of-interest engine, a representation of a set of source items identified as being of interest to a target user;
determining a set of item categories associated with said set of source items; and
selecting, from the set of item categories, a subset of item categories to use to present the set of source items to the target user, wherein selecting the subset of item categories comprises filtering out at least a first item category from the set based, at least in part, on a calculated measure of overlap between the first item category and one or more other item categories in said set.

19. The non-transitory computer storage of claim 18, wherein the process comprises calculating said measure of overlap based on categorizations of said source items.

20. The non-transitory computer storage of claim 19, wherein the process comprises giving different amounts of weight to different source items in calculating said measure of overlap.

21. The non-transitory computer storage of claim 18, wherein the subset of item categories is personalized for the target user.

22. The non-transitory computer storage of claim 18, wherein the process further comprises generating a user interface that includes functionality for the user to interactively browse the set of source items using the selected subset of item categories.

23. The non-transitory computer storage of claim 22, wherein the user interface is a text cloud interface in which each item category in said subset is selectable to view the source items falling therein.

24. The non-transitory computer storage of claim 18, in combination with said computer system, wherein the computer system is programmed with said executable code to perform said process.

25. The non-transitory computer storage of claim 18, wherein the process comprises taking a ranking of the set of source items into consideration in determining which item category or categories to filter out, said ranking being specific to the target user.

26. The non-transitory computer storage of claim 18, wherein the process is performed substantially in real time in response to a request by the target user for recommendations.

* * * * *